United States Patent Office 3,118,732
Patented Jan. 21, 1964

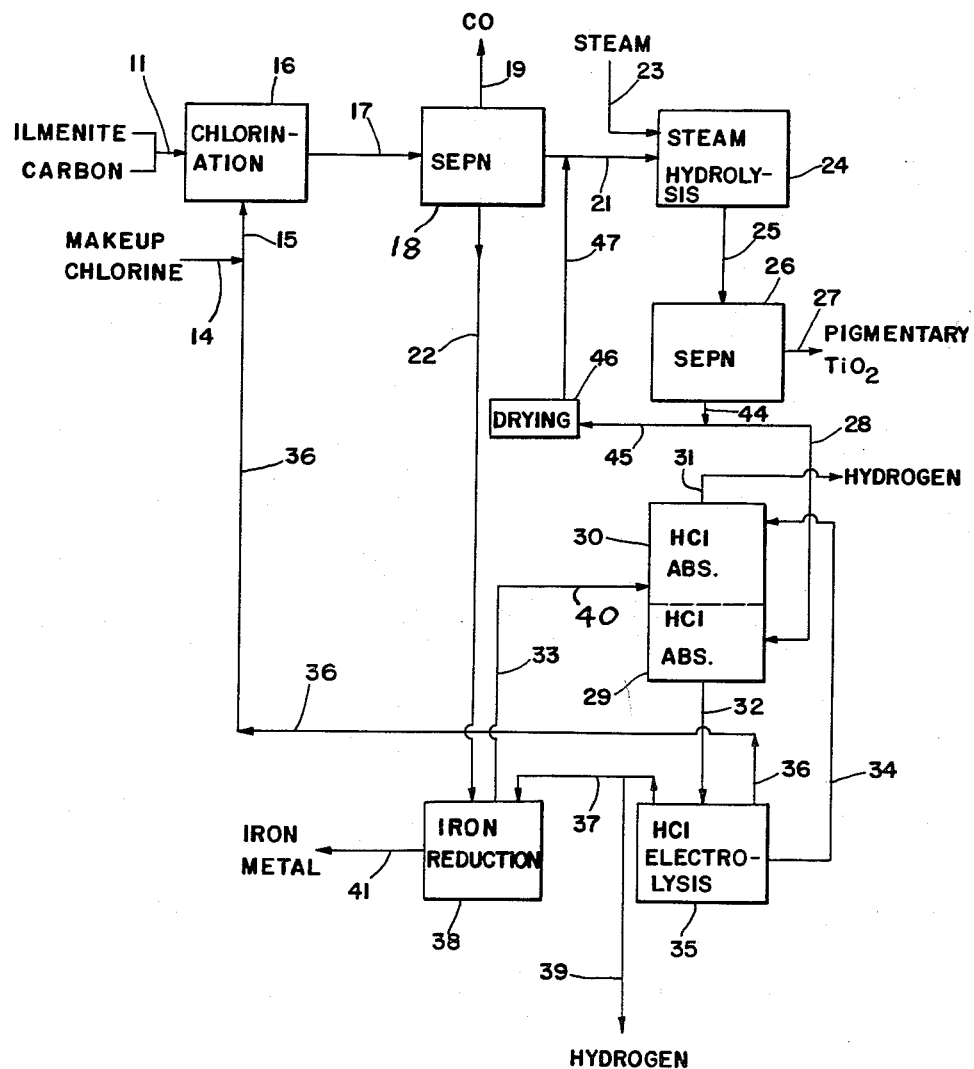

3,118,732
CYCLIC PROCESS FOR PRODUCING TITANIUM DIOXIDE PIGMENT
Joseph D. Richards, Lutherville, Baltimore, and Frank O. Rummery and Reuben Roseman, Baltimore, Md., assignors to The Glidden Company, Cleveland, Ohio, a corporation of Ohio
Filed Jan. 29, 1962, Ser. No. 169,458
1 Claim. (Cl. 23—202)

This invention relates to a cyclic process for producing pigmentary rutile titanium dioxide and more particularly to such process wherein the titaniferous charge is ilmenite.

Advantages of our process over conventional ilmenite processing techniques inside avoidance, of copper as waste disposal and high yields of valuable, recoverable products and byproducts.

Broadly, the process comprises: chlorinating ilmenite in the presence of carbon with elemental chlorine, the major part of which is recovered from a later step of the process, to titanium tetrachloride and iron chlorides; separating the resulting carbon monoxide, iron chlorides, and titanium tetrachloride from each other; hydrolyzing in the vapor phase in a hydrolysis zone said separated titanium tetrachloride with superheated steam at a temperature of at least about 800° C. using a residence time of at least about 5 seconds in said zone, thereby forming pigmentary rutile titanium dioxide and HCl hydrolysis byproduct; separating said titanium dioxide from the HCl hydrolysis byproduct; absorbing separated HCl hydrolysis byproduct and additional HCl byproduct from a later step of the process in an aqueous medium; electrolytically converting resulting absorbed HCl into recovered elemental chlorine and recovered hydrogen; recycling recovered elemental chlorine to the ilmenite chlorination step; converting said separated iron chlorides into elemental iron and additional HCl byproduct by reaction of said separated iron chlorides with a portion of said recovered hydrogen; and passing said additional HCl byproduct into the HCl absorption step.

The drawing is a flow diagram illustrating the major processing steps. The equipment for the process is conventional, the materials of construction being in the main corrosion resistant and, where necessary, able to withstand high temperature. Suitable materials of construction include vitreous and ceramic substances and linings of same, impervious graphite, and the like. Heaters and heat exchangers, flow control devices, instruments, comminuting equipment, collection and storage equipment, etc., are not shown but are understood to be of a conventional nature and installed where necessary or desirable.

An important step in the process for making the rutile titania is the steam hydrolysis operated in accordance with copending patent application S.N. 169,583, filed on even date herewith by Gordon D. Cheever et al., the disclosure of which is incorporated herein. Here titanium tetrachloride vapor feed is reacted with a superheated steam at a temperature of at least about 800° C. and advantageously 900–950° C. using a residence time of at least about 5 seconds and preferably longer in the hydrolysis reactor whereby pigmentary rutile titanium dioxide and HCl hydrolysis byproduct are formed.

The process will be more clearly understood from the following example which describes the basis for design of a plant processing nominally 150 tons of ilmenite per operating day (t./o.d.). Reference is made to the drawing illustrating the flow of process streams in the example.

*Example*

Ground ilmenite, 148.9 tons per day, and ground petroleum coke, 120.7 tons per day, are premixed and passed into chlorination unit 16 through inlet 11. The ilmenite analysis is as follows:

| | Percent by weight |
|---|---|
| $TiO_2$ | 59.25 |
| Total Fe | 23.46 |
| $Fe^{+++}$ | 19.22 |
| $Fe^{++}$ | 4.75 |
| $SiO_2$ | 1.33 |
| CaO | 1.17 |
| MgO | 1.11 |
| $Al_2O_3$ | 2.27 |
| $Cr_2O_3$ | 0.15 |
| $V_2O_5$ | 0.22 |
| MnO | 0.40 |
| $P_2O_5$ | 0.19 |

Simultaneously, these ground mixed feeds are reacted at 950° C. with a flow of chlorine entering unit 16 through inlet 15. The chlorination products, principally carbon monoxide, ferrous chloride, and $TiCl_4$, are withdrawn in vapor phase from unit 16 through outlet 17 and separated in conventional manner in separator 18. The "non-condensable" carbon monoxide is withdrawn through outlet 19 and can be used for fuel or other chemical production. The iron chloride is withdrawn from separation unit 18 by means of line 22, comminuted if necessary, and fed into iron reduction unit 38.

The titanium tetrachloride is withdrawn from separation unit 18 by means of outlet 21 and is passed into steam hydrolysis unit 24 with the assistance of an entraining flow of dry hydrogen chloride entering from line 47.

Also fed into the steam hydrolysis unit is a flow of superheated steam impinging in the unit on the $TiCl_4$ feed, the mol ratio of steam to $TiCl_4$ being 2:1. The temperature of the hydrolysis unit is maintained at 950° C. and the residence time of these reactants in unit 24 is 9 seconds, this residence time being computed by dividing the volume of the reaction zone by the volumetric rate of the reactant feeds, including diluents, at the reaction zone temperature and pressure.

The resulting product, a suspension of preponderantly rutile pigmentary titanium dioxide borne in a stream of steam and byproduct and entraining HCl, is withdrawn from unit 24 through line 25 and passed into $TiO_2$ separation unit 26.

In this separation unit the pigmentary titania is allowed to settle, and is withdrawn through outlet 27 at the rate of 75 t./o.d. It subsequently can be heated to drive off residual HCl, then cooled and comminuted in conventional manner by means not shown.

The hydrolysis byproduct and entraining HCl is withdrawn from separation unit 26 by means of outlet 44. A portion of this HCl passes through outlet 45 for drying, and the balance passed through line 28 into HCl absorber 29.

Here the hydrolysis byproduct and entraining HCl is absorbed in a lean aqueous hydrochloric acid solution passing from HCl tail gas absorber 30. The resulting rich hydrochloric acid solution of 33% by weight HCl passes through outlet 32 into HCl electrolysis unit 35. Electrolysis unit 35 is the Oronzio de Nora Impianti Electro-Chemici electrolyzer and appurtenant equipment as is described in Chemical Engineering, July 25, 1960, pages 63–65.

In the electrolysis unit the rich acid from absorber 29 is broken down into hydrogen and chlorine passing out of the unit through lines 37 and 36, respectively. Also withdrawn from unit 35 is an aqueous solution of depleted acid passing through line 34 into HCl tail gas absorber 30. The chlorine flow from the electrolysis unit is dried in conventional 98% sulfuric acid contact equipment not shown and returned to chlorination unit 16 through line 36 and inlet 15. Make-up chlorine for the system is fed into line 14 as necessary to offset chlorine losses in the process. The hydrogen from electrolysis unit 35 is washed free of HCl with a lime solution and dried by sulfuric acid in conventional manner by means not shown. A portion of this hydrogen is passed into iron reduction unit 38 by means of line 37. The balance is withdrawn from the system through line 39.

Iron reduction unit 38 is operated at an average temperature of 750° C. ±50° C. In the unit pulverulent iron chloride is reduced to elemental iron, generating additional HCl byproduct. Iron metal, 31.4 t./o.d., is discharged from the system through outlet 41, while said additional hydrogen chloride byproduct and unreacted hydrogen pass through line 33 and inlet 40 into HCl tail gas absorber 30, previously described. Herein the additional HCl byproduct is recovered by absorption in the spent HCl solution from electrolysis unit 35, while unabsorbed hydrogen is withdrawn through outlet 31. This hydrogen can be cleansed of HCl and dried in the same equipment as the hydrogen from the electrolysis unit, then withdrawn from the system. It can be used as fuel or in chemical manufacture.

The portion of hydrolysis byproduct and entraining HCl withdrawn through line 45 passes into dryer 46 and is dried by contact with 98% sulfuric acid. This dry hydrogen chloride is passed through line 47 and used for entraining titanium tetrachloride feed to steam hydrolysis unit 24. If desired, a portion of the hydrogen chloride separated from the iron reduction unit and passing through line 33 can bypass tail gas absorber 30, be fed into drying unit 46 by means not shown, and be used also for entraining TiCl$_4$ feed to the steam hydrolysis unit.

For efficiency and economy in the operation the drying of gases is done to obtain a dew point of at least about −40° F. Other suitable desiccants for the process include lithium chloride solution and silica gel adsorbers. The HCl absorbing and stripping units advantageously are operated at about atmospheric pressure. In the place of petroleum coke other carbon also can be used, e.g., anthracite, char, or the like, and it is preferred that the carbon used be low in sulfur to minimize formation of sulfurous byproducts.

The titanium tetrachloride feed to the hydrolysis unit need not be entrained in a stream of dry HCl, but can be fed straight or with an inert gas entrainer such as nitrogen, non-reducing flue gas, or the like. However, the use of HCl entraining agent is preferred for convenient regulation of titanium tetrachloride flow. It also can provide a slight suppression of the hydrolysis rate in unit 24 whereby crystal growth in the hydrolysis reactor is more readily controlled and the formation of undesirable plugs and other agglomerative growths in the hydrolysis unit suppressed.

In place of electrolyzing the HCl solution into hydrogen and chlorine with the De Nora process various other electrolytic ways can be used. These are modifications of the Deacon process as outlined in the September 1950 issue of Chemical Engineering Progress, 46, pages 456–63 and further described in U.S. Patent 2,468,766.

We claim:

A cyclic process for producing pigmentary rutile titania from ilmenite which comprises: chlorinating ilmenite in the presence of carbon with elemental chlorine, the major part of which is recovered from a later step of the process, to titanium tetrachloride and iron chlorides; separating the resulting carbon monoxide, iron chlorides, and titanium tetrachloride from each other; passing separated titanium tetrachloride, superheated steam, and byproduct HCl recovered from at least one step of the process into a hydrolysis zone, and therein hydrolyzing in the vapor phase said separated titanium tetrachloride at a temperature of at least about 800° C. using a residence time of at least about 5 seconds in said zone, thereby forming pigmentary rutile titanium dioxide and HCl hydrolysis byproduct; separating said titanium dioxide from the HCl hydrolysis byproduct; absorbing separated HCl hydrolysis byproduct and additional HCl byproduct from a later step of the process in an aqueous medium, electrolytically converting resulting absorbed HCl into recovered elemental chlorine and recovered hydrogen; recycling recovered elemental chlorine to the ilmenite chlorination step; converting said separated iron chlorides into elemental iron and additional HCl byproduct by reaction of said said iron chlorides with a portion of said recovered hydrogen; and passing said additional HCl byproduct into the HCl absorption step.

References Cited in the file of this patent

UNITED STATES PATENTS

| | | |
|---|---|---|
| 1,451,399 | Low | Apr. 10, 1923 |
| 1,847,435 | Low | Mar. 1, 1932 |
| 1,906,467 | Heath | May 2, 1933 |
| 1,967,235 | Ferkel | July 24, 1934 |
| 2,184,887 | Muskat et al. | Dec. 26, 1939 |
| 2,245,358 | Pechukas | June 10, 1941 |
| 2,436,432 | Hunter | Feb. 24, 1948 |
| 2,488,440 | Schaumann | Nov. 15, 1949 |
| 2,791,490 | Willcox | May 7, 1957 |

OTHER REFERENCES

J. W. Mellor's "A Comprehensive Treatise on Inorganic and Theoretical Chem.," vol. 14, 1935 ed., pages 20 and 70.

UNITED STATES PATENT OFFICE
CERTIFICATE OF CORRECTION

Patent No. 3,118,732                                        January 21, 1964

Joseph D. Richards et al.

It is hereby certified that error appears in the above numbered patent requiring correction and that the said Letters Patent should read as corrected below.

Column 1, line 16, for "inside avoidance, of copper as" read -- include avoidance of copperas --; column 4, line 35, strike out "said", second occurrence.

Signed and sealed this 16th day of June 1964.

(SEAL)
Attest:

ERNEST W. SWIDER                                       EDWARD J. BRENNER
Attesting Officer                                             Commissioner of Patents